No. 698,691. Patented Apr. 29, 1902.
T. DUNCAN.
ELECTRICAL MEASURING INSTRUMENT.
(Application filed Mar. 8, 1900.)
(No Model.) 2 Sheets—Sheet 1.
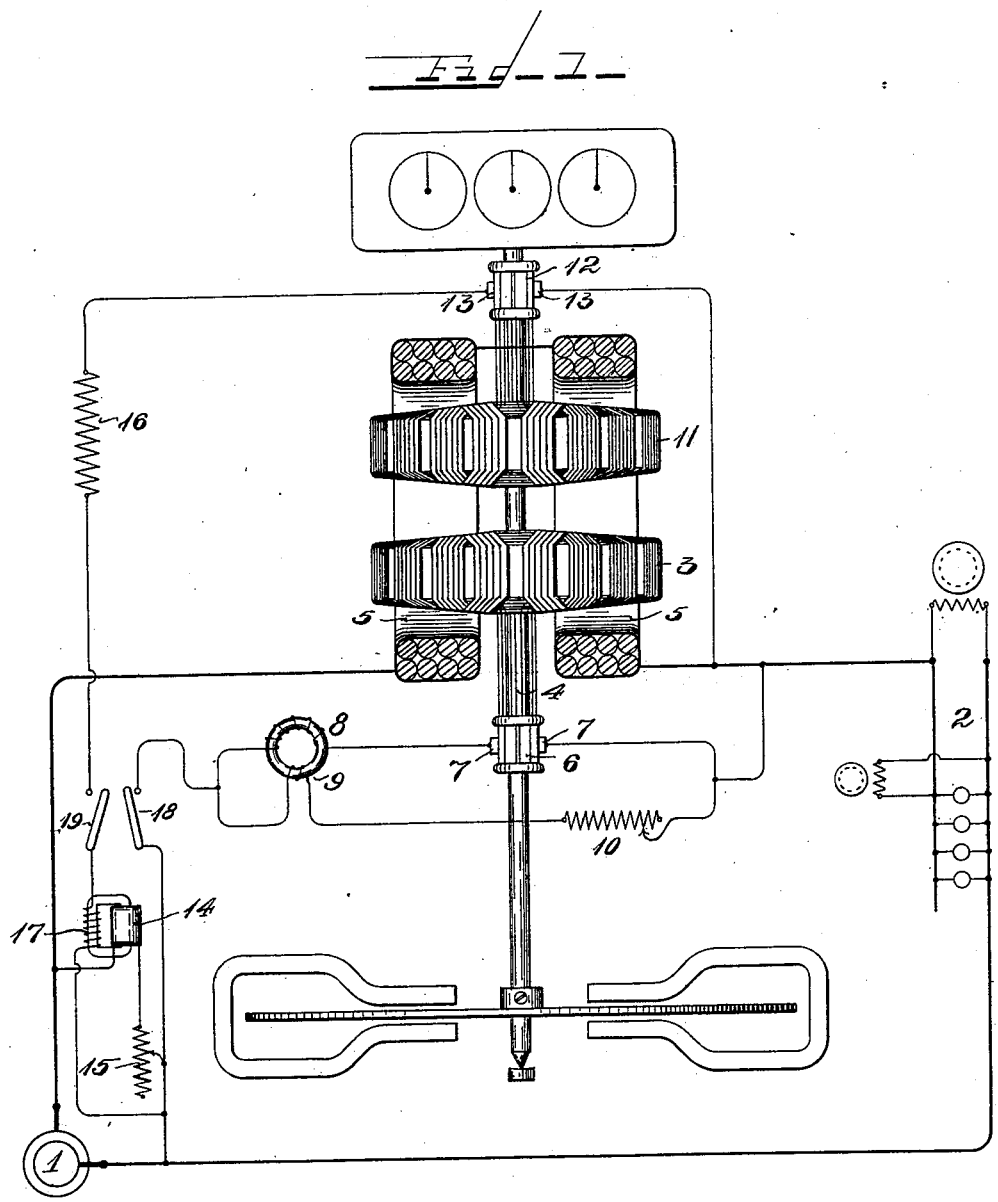

No. 698,691. Patented Apr. 29, 1902.
T. DUNCAN.
ELECTRICAL MEASURING INSTRUMENT.
(Application filed Mar. 8, 1900.)
(No Model.) 2 Sheets—Sheet 2.
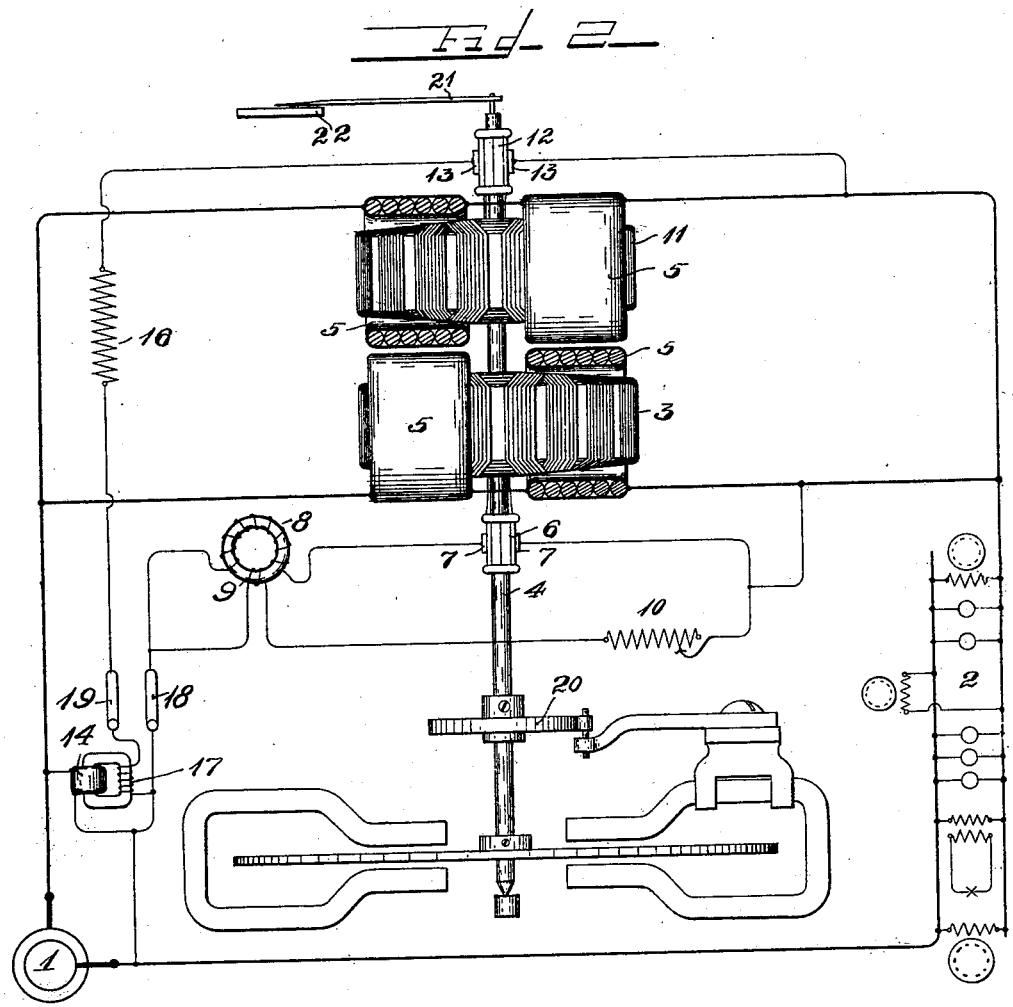
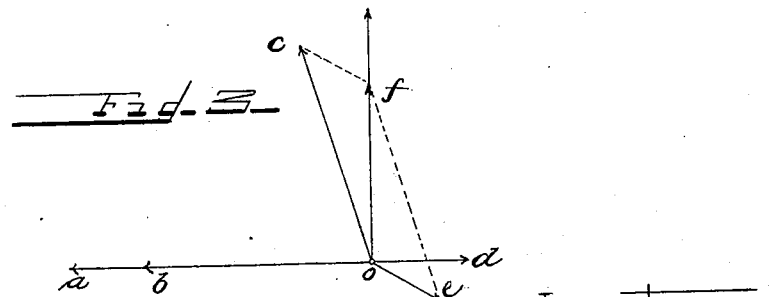
Witnesses
May W. Label.
Chas. J. Schmidt.
Inventor
Thomas Duncan
By Charles A. Brown Cragg
Attorneys

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,691, dated April 29, 1902.

Application filed March 8, 1900. Serial No. 7,805. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 361,) of which the following is a full, clear, concise, and exact description, reference being had to the accompanying drawings, forming a part of this specification.

My invention relates to improvements in measuring instruments for use in connection with alternating currents, and particularly with the kind of motor-meter having a field-producing winding upon its armature, one of the main objects of my present invention being to adapt the instrument to the measurement of real watts and the wattless or magnetizing component of alternating current.

I am enabled by means of my invention to employ a single indicator or other measuring device operated by a movable armature composing part of a meter that is capable of effecting the measurement of either of these load conditions.

In my application Serial No. 735,808, filed November 4, 1899, I have set forth a meter having a movable winding for measuring the wattless component of alternating current in a system of distribution, and by means of my present invention I am enabled, in addition to measuring the true watts, also to measure the wattless component by proper adjustment of the meter-windings. I preferably employ switching means for manipulating the meter of my invention, whereby either the real watts or the magnetizing component of the current may be determined with the same meter.

In practicing my invention I preferably employ two sets of motor-windings, one to be employed for the measurement of the true watts, the other for the measurement of the magnetizing component.

In the preferred form of my invention I mount two armatures upon a common rotatable spindle and provide commutators, one for each armature. I preferably arrange a current field-winding common to both armatures. Means are associated with one of the armatures for maintaining the field due thereto in phase with the pressure, means associated with the other armature for maintaining the field due thereto in quadrature with the pressure, and switching apparatus for cutting one or the other of the armatures into circuit between the distributing-mains, whereby either of the load conditions mentioned may be determined.

I will more fully describe my invention by reference to the accompanying drawings, illustrating the preferred embodiment thereof, in which—

Figure 1 is a diagrammatic view showing a recording-meter and circuit connections constructed and arranged in accordance with my invention. Fig. 2 is a view showing an indicating-meter and circuit connections arranged and constructed in accordance with my invention. Fig. 3 is a vector diagram illustrating the phase relations of the fields with the pressure.

Like parts are indicated by similar characters of reference throughout the different figures.

An alternating-current generator 1 is shown as supplying the current to translating devices 2. An armature-winding 3, composed of coils of fine wire, is mounted upon the rotating spindle 4, current-coils 5 5 for this armature being included in series with one of the main conductors extending from the source of alternating current to the translating devices. The series coils are located upon opposite sides of the spindle 4, the said armature-winding projecting within the interior of the said coils. Said series windings thus included in series with the translating devices set up a magnetic field that is proportional to the current strength. The coils of the armature 3 are connected with the segments of the commutator 6 in the usual way, the commutator-brushes 7 serving to include the armature in bridge between the main leads extending from the generator. In order that this portion of the meter may accurately measure the wattless magnetizing components in alternating-current power-circuits, I provide means whereby a torque varying as the product of current, electromotive force, and the sine of the angle of lag is created. This I accomplish by bringing the fields due to the series and shunt windings in phase when current in the work-circuit lags ninety degrees, thereby to produce the maximum torque and bringing about a variation of the phase difference between these fields when the current ceases to lag ninety degrees.

In the particular embodiment of the invention shown the pressure field should be maintained in quadrature with the line-pressure, so that the torque will vary as the product of current, electromotive force, and the sine of the angle of lag of the current through the translating devices and be zero when the current and pressure are in phase when there is no lag in the work-circuit. I cause this revoluble armature-winding to create a magnetic field that is in quadrature with the pressure by connecting it in series with an impedance-coil 8 and superimposing upon this impedance-coil a secondary winding 9 in series with the non-inductive resistance 10. The secondary winding and the said adjusting resistance are in parallel with the impedance-winding 8 and the armature 3. By this arrangement current through the armature 3 is caused to lag ninety degrees behind the electromotive force, as will be hereinafter explained. The upper armature 11 is also composed of coils of fine wire and is mounted upon a rotating spindle 4. In Fig. 1 this armature is surrounded by the series coils 5 5, that also surround the armature 3. In Fig. 2 the said armature is surrounded by a distinct pair of current-coils 5 5. All of the current-coils of the instrument shown in Fig. 2 may be included in series, if desired. The current-winding surrounding the armature 11 thus sets up a magnetic field that is proportional to the current strength. The coils of the armature are connected with the segments of the commutator 12 in a usual way, the commutator-brushes 13 serving to include the armature in a bridge between the main leads extending to the generator. This armature serves in coöperation with the current-winding surrounding the same to measure the real watts, for which purpose I so adjust the field due to this winding that it is maintained in phase with the pressure, so that the torque will vary as the product of current, electromotive force, and the cosine of the angle of lag of the current through the translating devices. This may be accomplished by providing a primary winding 14 in bridge of the distributing-mains and in series with an adjusting resistance 15 and including the armature-winding in another bridge between the distributing-mains and including in the said bridge an adjusting resistance 16 and a coil 17 in secondary relation to the primary 14.

In Fig. 3, $o\ a$ represent the line or impressed electromotive force; $o\ b$, the magnetism due to the armature 11; $o\ c$, to the lag of the current due to coil 8; $o\ d$, the electromotive force induced in turns 8 by the turns 9; $o\ e$, the current induced in the said turns 8 by turns 9, and $o\ f$ the effective current field of armature 3, being the resultant of the currents $o\ c$, $o\ e$, the resultant being in exact quadrature with the impressed electromotive force $o\ a$. The line $o\ f$ also represents the magnetism due to the current in armature 3.

The armatures 3 and 11 are adapted for inclusion in independent conductors. Switches 18 and 19 are employed, adapted, respectively, to include the armatures 3 and 11 in bridge between the distributing-mains. Upon closing switch 18, the switch 19 being open, the instrument will effect a measurement of the wattless component. By closing switch 19 and opening the switch 18 the instrument will measure the real or true watts. This instrument being an indicating instrument is provided with a torsional spring 20, a pointer 21, and a measuring-scale 22.

While I have shown keys for controlling the connections of the pressure-windings of the two sets of motor-windings, I do not wish to be limited to this precise means for controlling the operation of the apparatus, as other means may be devised.

I do not wish to be limited to a construction wherein the pressure-windings are movable.

Modifications may readily be made in the apparatus of my invention without departing from its spirit, and I do not, therefore, wish to limit myself to the precise embodiment of my invention herein shown and particularly described; but,

Having thus described my invention, I claim as new and desire to secure by Letters Patent—

1. In an alternating-current meter, the combination with a measuring element, of windings for causing an actuation of said measuring element, said actuation being proportional to the true watts and to the magnetizing component, a portion of said windings being carried by said measuring element, and means for limiting the action of the said windings to cause an actuation of the said measuring element proportional to the true watts or to the magnetizing component, substantially as described.

2. In an alternating-current meter, the combination with a measuring element, of two sets of windings, each comprising a current and a pressure winding for causing an actuation of the measuring element said actuation being proportional to the true watts and to the magnetizing component, a portion of said windings being carried by said measuring element, and switching means adapted to control the continuity of circuit connections for limiting the measuring element to the action of one of the windings, substantially as described.

3. In an alternating-current meter, the combination with a measuring element, of pressure and current field-windings for causing an actuation of the said measuring element said actuation being proportional to the true watts and to the magnetizing component, a portion of said windings being carried by said measuring element, and switching means adapted to control the continuity of circuit connections for limiting the actuation of said measuring element proportional to either the true watts or to the magnetizing component, substantially as described.

4. In an alternating-current meter, the combination with a measuring element, of pressure and current field-windings for producing torques upon the measuring element proportional to the true watts and to the magnetizing component, a portion of said windings being carried by said measuring element, and means for permitting said element to be subjected to either torque alone, substantially as described.

5. In an alternating-current meter, the combination with a measuring element, of pressure and current field-windings for producing torques upon the measuring element proportional to the true watts and to the magnetizing component, a portion of said windings being carried by said measuring element, and means for limiting the measuring element to the action of one of the torques, substantially as described.

6. In an alternating-current meter, the combination with means for producing two pressure fields substantially in quadrature with each other, of means for producing a third field varying in phase with the current, a movable measuring element carrying a portion of the windings of the meter, and means whereby said measuring element may be subjected to the action of the current field and one pressure field only, substantially as described.

7. In an alternating-current meter, the combination with means for producing two pressure fields substantially in quadrature with each other, of means for producing a third field varying in phase with the current, a movable measuring element supporting the windings for creating the pressure fields, and means whereby said measuring element may be subjected to the action of the current field and one pressure field only, substantially as described.

8. In an alternating-current meter, the combination with means for producing two pressure field-windings substantially in quadrature with each other, of means for producing a third field varying in phase with the current, a movable measuring element, said measuring element carrying the windings for producing the pressure fields, the latter field in coöperation with one of the pressure fields serving to actuate said measuring element to determine the true watts and in coöperation with the other field to move said element to determine the magnetizing component, and means whereby said element may be subjected to the action of either one only of said torques, substantially as described.

9. In a system of alternating-current distribution, the combination with an alternating-current generator, of a movable element, electromagnetic means receiving current from said generator for exerting two torques upon said element respectively proportional to the true watts and the magnetizing component, a portion of said electromagnetic means being carried by said movable element, and means whereby said element may be subjected to either of said torques, substantially as described.

10. In a system of alternating-current distribution, the combination with an alternating-current generator, of a movable element, electromagnetic means receiving current from said generator for exerting two torques upon said element respectively proportional to the true watts and the magnetizing component, a portion of said electromagnetic means being carried by said movable element, and means whereby said element may be subjected to one only of said torques, substantially as described.

11. In a system of alternating-current distribution, the combination with an alternating-current generator, of a movable element, and electromagnetic means receiving current from said generator for exerting two torques upon the movable element, a portion of said electromagnetic means being carried by said movable element, one of said torques being capable of causing movement of said element proportional to the true watts, and the other, movement of said element proportional to the magnetizing component of the alternating current, and means whereby said element may be subjected to either one only of said torques, substantially as described.

12. In an alternating-current meter, the combination with a measuring element, of electromagnetic means adapted in coöperation with said measuring element to measure the true watts in an alternating-current circuit, a second electromagnetic torque-producing means adapted, in coöperation with said measuring element, to measure the wattless component in an alternating-current circuit, a portion of said electromagnetic means being carried by said measuring element, and means for bringing the torque-producing means into and out of effective association with the measuring element, substantially as described.

13. In an alternating-current meter, the combination with a measuring element, of an electromagnetic torque-producing means adapted, in coöperation with said measuring element, to measure the true watts in an alternating-current circuit, a second electromagnetic torque-producing means adapted, in coöperation with said measuring element, to measure the wattless component in an alternating-current circuit, a portion of said electromagnetic means being carried by said measuring element, and means for bringing each torque-producing means into and out of effective association with said measuring element, substantially as described.

14. In a meter for alternating-current circuits provided with relatively movable members in combination, means for producing a torque between said members proportional to the real watts of the current flowing in said circuit, means for producing between said members a second torque proportional to the wattless component of said current, and means whereby the meter may be subject to one of said torques alone, substantially as described.

15. In a meter for alternating-current circuits in combination, a series winding or windings, a plurality of shunt-windings inductively related thereto, means for causing a current to flow in one of said shunt-windings in phase with the electromotive force of the circuit, means for causing a current to flow in another of said windings in quadrature with said electromotive force, and means permitting the flow of current through one of the said shunt-windings alone, substantially as described.

16. In a meter for alternating-current circuits in combination, a series winding or windings, a plurality of shunt-windings inductively related thereto, means for causing a current to flow in one of said shunt-windings in phase with the electromotive force of the circuit, means for causing a current to flow in another of said windings in quadrature with said electromotive force, means for permitting the flow of current through one of the said shunt-windings alone, and a common support for the shunt-windings, movable with respect to said series winding or windings, substantially as described.

In witness whereof I hereunto subscribe my name this 3d day of March, A. D. 1900.

THOMAS DUNCAN.

Witnesses:
  MAX W. ZABEL,
  CHARLES E. HUBERT.